(12) United States Patent
Dang

(10) Patent No.: US 8,468,514 B2
(45) Date of Patent: Jun. 18, 2013

(54) SYSTEM AND METHOD FOR UPDATING UNIFIED EXTENSIBLE FIRMWARE INTERFACE SETTING INFORMATION

(75) Inventor: De-Hua Dang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 397 days.

(21) Appl. No.: 12/894,161

(22) Filed: Sep. 30, 2010

(65) Prior Publication Data

US 2011/0271268 A1 Nov. 3, 2011

(30) Foreign Application Priority Data

Apr. 28, 2010 (CN) .......................... 2010 1 0157208

(51) Int. Cl.
G06F 9/44 (2006.01)
(52) U.S. Cl.
USPC ........................................................ 717/168

(58) Field of Classification Search
None
See application file for complete search history.

(56) References Cited

U.S. PATENT DOCUMENTS

| 7,747,848 B1* | 6/2010 | Nallagatla et al. | 713/2 |
| 7,904,708 B2* | 3/2011 | Harmer | 713/2 |
| 2011/0208955 A1* | 8/2011 | Anbazhagan et al. | 713/2 |

\* cited by examiner

Primary Examiner — Philip Wang
(74) Attorney, Agent, or Firm — Altis Law Group, Inc.

(57) ABSTRACT

A system and method can update unified extensible firmware interface (UEFI) setting information of a computer. The method creates a system management interrupt (SMI) function based on a UEFI platform of the computer, and stores the SMI function in a SMRAM of the computer. The method further generates an access address of the SMI function when a configuration command is input from an input device, and generate a SMI handler according to the access address. Additionally, the method calls a runtime service function of the UEFI platform by executing the SMI function through the SMI handler, and executes the runtime service function to configure UEFI setting information stored in a flash memory chip and to update BIOS data stored in a CMOS chip related to the UEFI setting information.

15 Claims, 3 Drawing Sheets

| Function name | Function type | Function description |
|---|---|---|
| GetVariable | Runtime | Return a variable |
| GetVariableName | Runtime | Get a variable name |
| SetVariable | Runtime | Set a variable |
| QueryVariableInfo | Runtime | Query UEFI information |

FIG. 2

SYSTEM AND METHOD FOR UPDATING UNIFIED EXTENSIBLE FIRMWARE INTERFACE SETTING INFORMATION

CROSS-REFERENCE TO RELATED APPLICATIONS

The present application claims for foreign priority based on application of CN 201010157208.6, filed in China on Apr. 28, 2010, the entire disclosure of which is incorporated herein by reference.

BACKGROUND

1. Technical Field

Embodiments of the present disclosure relate generally to systems and methods for updating configuration of computing systems, and more particularly to a system and method for updating unified extensible firmware interface (UEFI) setting information of a computing system.

2. Description of Related Art

Computing systems have a basic input/output system (BIOS) that controls hardware elements within the computing systems. For example, the BIOS may contain code to control a keyboard, a display screen, or disk drives. Typically, the BIOS is stored in a complementary metal oxide semiconductor (CMOS) chip that may be a read-only memory (ROM) of a computing system. In some computing systems, the BIOS may also be stored in a flash memory chip that allows the BIOS to be updated if necessary.

Some computing systems may also have a UEFI platform that defines a new interface between operating systems and the hardware elements. The UEFI platform includes data tables containing UEFI setting information that are available to an operating system (OS) of the computing system. In order to configure settings for the hardware elements controlled by the BIOS, a user can interact with a BIOS setup utility provided by a computer system manufacturer. However, it is difficult for the user to configure the UEFI setting information of the computing system in the even that the user does not know the UEFI platform well.

BRIEF DESCRIPTION OF THE DRAWINGS

FIG. 2 is a schematic diagram illustrating one example of a runtime service function included in the UEFI platform.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
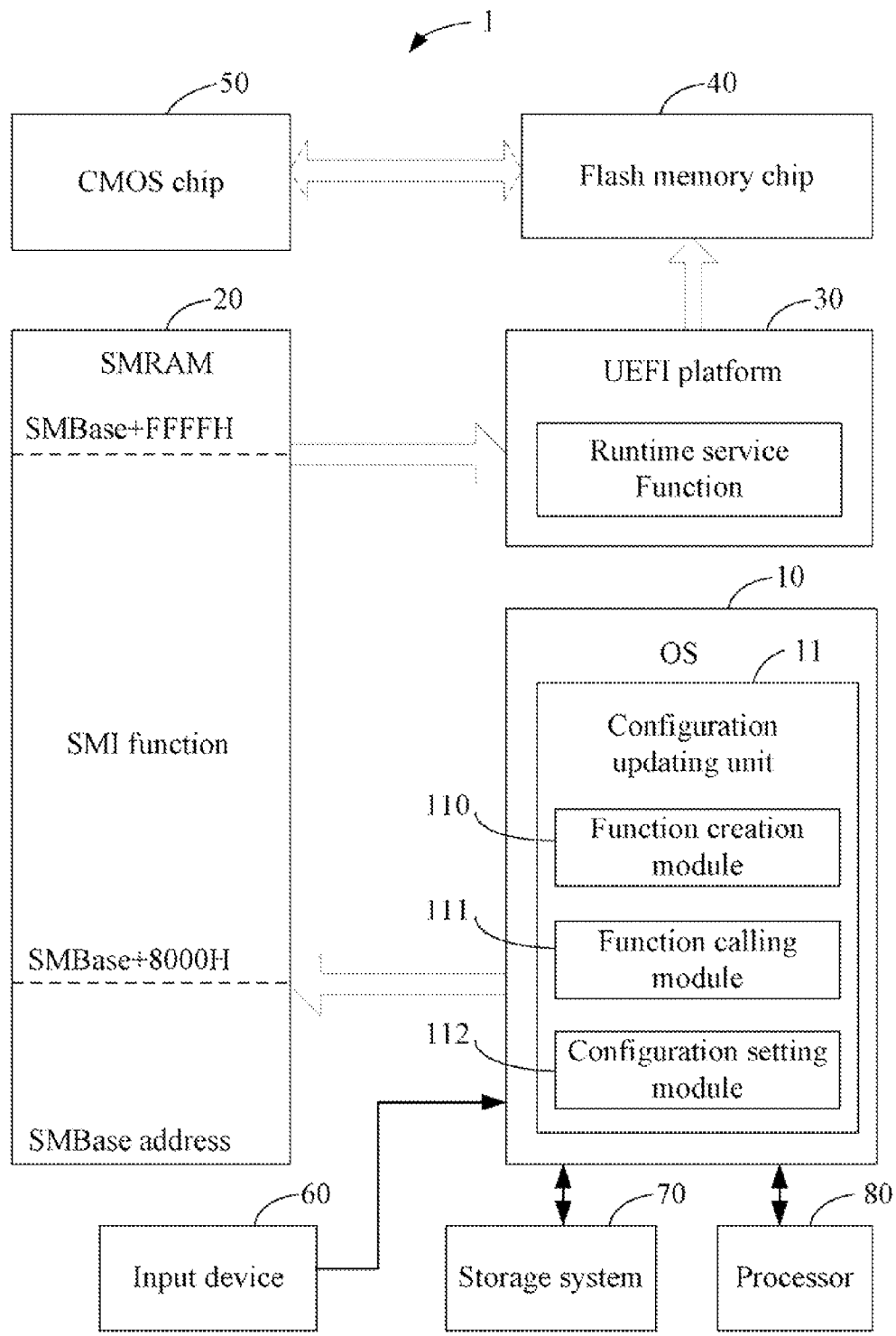
FIG. 1 is a schematic diagram of one embodiment of a computer having a UEFI platform.

FIG. 1 is a schematic diagram of one embodiment of a computer 1 having a unified extensible firmware interface (UEFI) platform 30. In the embodiment, the computer 1 may further include an operating system (OS) 10, a system management random access memory (SMRAM) 20, a flash memory chip 40, a complementary metal oxide semiconductor (CMOS) chip 50, an input device 60, a storage system 70, and at least one processor 80. It should be apparent that FIG. 1 illustrates only one example of the computer 1, and may include more or fewer components than illustrated, or a different configuration of the various components in other embodiments.

As used herein, the UEFI platform 30 is defined as an interface between the OS 10 and hardware of the computer 1, and includes UEFI setting information of firmware that are available to the OS 10 of the computer 1. In one embodiment, the hardware may include, but not limited to, a keyboard, a display screen, a disk drive, a video card, and a mouse. The firmware may be a combination of the hardware and software code for the hardware. In the UEFI platform 30, the hardware configuration information, such as basic input/output system (BIOS) data, may be stored in the CMOS chip 40, and the firmware configuration information, such as UEFI setting information, may be stored in the flash memory chip 40.

The SMRAM 20 stores a plurality of system management interrupt (SMI) functions that can be executed by the OS 10 when the UEFI setting information needs to be updated. The UEFI platform 30 may be include a plurality of data tables for storing the UEFI setting information, and system management functions for management of the OS 10 and hardware of the computer 1. In one embodiment, the system management functions may include a boot service function and a runtime service function. The boot service function may be executed by the processor 80 to boot the OS 10 when the computer 1 is powered on. The runtime service function may be called by the OS 10 at any time during the running process of the OS 10.

The OS 10 includes a configuration updating unit 11 for configuring the UEFI setting information stored in the flash memory chip 40, and updating the BIOS data stored in the COMS chip 50 related to the UEFI setting information. The configuration updating unit 11 may include a plurality of functional modules including one or more computerized instructions that are stored in the storage system 70. In one embodiment, the storage system 70 may be an internal storage device, such as a random access memory (RAM) for temporary storage of information, and/or a read only memory (ROM) for permanent storage of information. In some embodiments, the storage system 70 may also be an external storage device, such as an external hard disk, a storage card, or a data storage medium.

In the embodiment, the configuration updating unit 11 include a function creation module 110, a function calling module 111, and a configuration setting module 112. One or more computerized instructions of the function modules 110-112 may be stored in the storage system 70 and executed by the at least one processor 80. In general, the word "module," as used herein, refers to logic embodied in hardware or firmware, or to a collection of software instructions, written in a programming language. The software instructions in the modules may be embedded in firmware, such as an erasable programmable read only memory (EPROM). The modules described herein may be implemented as either software and/or hardware modules and may be stored in any type of computer-readable medium or other storage device.

The function creation module 110 is operable to create an SMI function based on the UEFI platform 30, and store the SMI function in the SMRAM 20. In one embodiment, the function creation module 110 may create the SMI function to process an interruption command when the interruption command is input from the input device 60. For example, a user may enter a "pause" key or a "break" key from the keyboard of the computer 1 as an interruption command, the function creation module 110 then creates the SMI function to process the interruption command.

The function calling module 111 is operable to generate an access address of the SMI function, and store the access address in an SMI list of the SMRAM 20. The access address may be an address value of the SMRAM 20. For example, the address value may be "SMBase+8000H," where "SMBase" represents a base address of the SMRAM 20. The function calling module 111 obtains the access address from the SMI list when a configuration command is input from the input device 60, and generates a SMI handler according to the access address. For example, if the user needs to configure the UEFI setting information of a video card attached to the computer 1, the configuration command "outpd(0xb2, 0xde, Set_Video)" may be entered in the input device 60. In the embodiment, the SMI handler is defined as an execution thread for executing the SMI function.

The function calling module 111 is further operable to activate the SMI function stored in the SMRAM 20 through the SMI handler, and call a runtime service function of the UEFI platform 30 by executing the SMI function. In one example with respect to FIG. 2, the runtime service function may be a Get_Variable function, a Get_Variable_Name function, a Set_Variable function, and a Query_Variable_Infor function. Each of the runtime service functions can perform a corresponding action, such as returning a variable for a hardware element of the computer 1, getting a variable name of the hardware element, setting a variable for the hardware element, or querying the UEFI information of the hardware element from the flash memory chip 40.

The configuration setting module 112 is operable to execute the runtime service function to configure the UEFI setting information stored in the flash memory chip 40, and to update the BIOS data stored in the COMS chip 50 related to the UEFI setting information. As mentioned above, when the user inputs the configuration command "outpd(0xb2, 0xde, Set_Video)" from the input device 60, the configuration setting module 112 may execute the Get_Variable function and the Set_Variable function to update the setting information of the video card attached to the computer 1.

Figure 3:
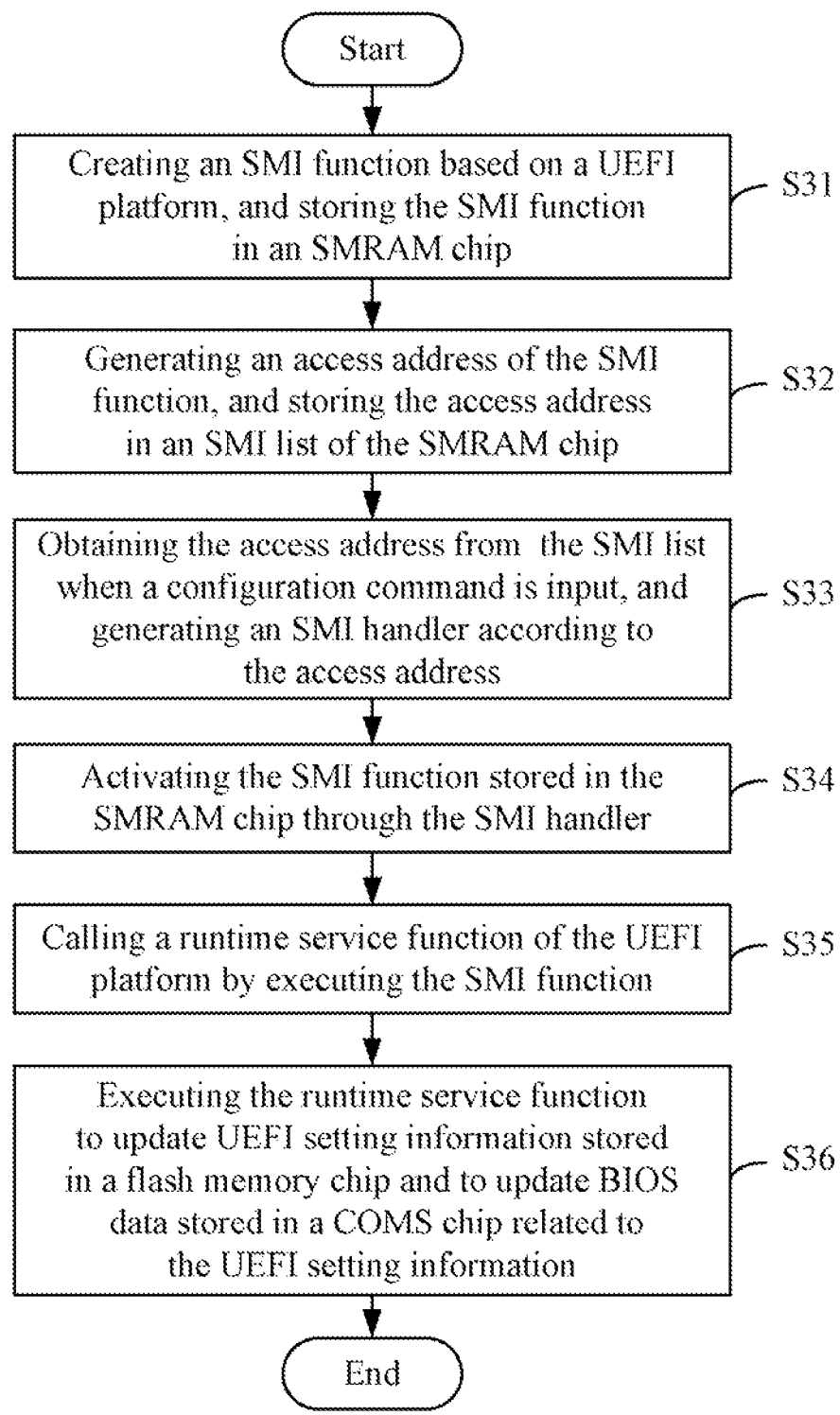
FIG. 3 is a flowchart of one embodiment of a method for updating UEFI setting information of the computer of FIG. 1.

FIG. 3 is a flowchart of one embodiment of a method for updating UEFI setting information of a computer system, such as the computer 1 of FIG. 1, for example. In the embodiment, the method can update the UEFI setting information stored in the flash memory chip 40, and update the BIOS data stored in the COMS chip 50 related to the UEFI setting information. Depending on the embodiment, additional blocks may be added, others removed, and the ordering of the blocks may be changed.

In block S31, the function creation module 110 creates an SMI function based on the UEFI platform 30, and stores the SMI function in the SMRAM 20. In one embodiment, the function creation module 110 may create the SMI function to process an interruption command when the interruption command is input from the input device 60.

In block S32, the function calling module 111 generates an access address of the SMI function, and stores the access address in an SMI list of the SMRAM 20. The access address may be an address value "SMBase+8000H," where the "SMBase" represents a base address of the SMRAM 20.

In block S33, the function calling module 111 obtains the access address from the SMI list when a configuration command is input from the input device 60, and generates a SMI handler according to the access address. For example, if a user needs to configure the UEFI setting information of a video card attached to the computer 1, the configuration command "outpd(0xb2, 0xde, Set_Video)" may be input from the input device 60. The SMI handler is defined as an execution thread for executing the SMI function.

In block S34, the function calling module 111 activates the SMI function stored in the SMRAM 20 through the SMI handler. In block S35, the function calling module 111 calls a runtime service function of the UEFI platform 30 by executing the SMI function. As mentioned above, the runtime service function may be a Get_Variable function, a Get_Variable_Name function, a Set_Variable function, or a Query_Variable_Infor function.

In block S36, the configuration setting module 112 executes the runtime service function to configure the UEFI setting information stored in the flash memory chip 40, and to update the BIOS data stored in the COMS chip 50 related to the UEFI setting information. As mentioned above, when the user inputs the configuration command "outpd(0xb2, 0xde, Set_Video)" from the input device 60, the configuration setting module 112 may execute the Get_Variable function and the Set_Variable function to update the setting information of the video card attached to the computer 1.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system for updating unified extensible firmware interface (UEFI) setting information of a computer, the computing system comprising:
   a storage system;
   at least one processor; and
   one or more programs stored in the storage system and executed by the at least one processor, the one or more programs comprising:
   a function creation module operable to create a system management interrupt (SMI) function based on a UEFI platform of the computer, and store the SMI function in a system management random access memory (SMRAM) of the computer;
   a function calling module operable to generate an access address of the SMI function, store the access address in an SMI list of the SMRAM, obtain the access address from the SMI list when a configuration command is input from an input device, generate an SMI handler according to the access address, activate the SMI function stored in the SMRAM through the SMI handler, and call a runtime service function of the UEFI platform by executing the SMI function, wherein the runtime service function is a function for returning a variable for a hardware element of the computer, a function for getting a variable name of the hardware element, or a function for setting a variable for the hardware element; and
   a configuration setting module operable to execute the runtime service function to configure UEFI setting information stored in a flash memory chip and to update basic input/output system (BIOS) data stored in a complementary metal oxide semiconductor (CMOS) chip related to the UEFI setting information.

2. The computing system according to claim 1, wherein the UEFI platform is an interface between an operating system (OS) and hardware of the computer.

3. The computing system according to claim 2, wherein the UEFI platform comprises a plurality of data tables for storing the UEFI setting information, and system management functions for management of the OS and the hardware of the computer.

4. The computing system according to claim 3, wherein the system management functions comprise a boot service function and the runtime service function.

5. The computing system according to claim 1, wherein the runtime service function is further includes a function for querying the UEFI setting information of the hardware element from the flash memory chip.

6. A method for updating unified extensible firmware interface (UEFI) setting information of a computer, the method comprising:
creating a system management interrupt (SMI) function based on a UEFI platform of the computer, and storing the SMI function in a system management random access memory (SMRAM) of the computer;
generating an access address of the SMI function, and storing the access address in an SMI list of the SMRAM;
obtaining the access address from the SMI list when a configuration command is input from an input device, and generating an SMI handler according to the access address;
activating the SMI function stored in the SMRAM through the SMI handler;
calling a runtime service function of the UEFI platform by executing the SMI function, wherein the runtime service function comprises a function for returning a variable for a hardware element of the computer, a function for getting a variable name of the hardware element, and a function for setting a variable for the hardware element; and
executing the runtime service function to configure UEFI setting information stored in a flash memory chip and to update basic input/output system (BIOS) data stored in a complementary metal oxide semiconductor (CMOS) chip related to the UEFI setting information.

7. The method according to claim 6, wherein the UEFI platform is an interface between an operating system (OS) and hardware of the computer.

8. The method according to claim 7, wherein the UEFI platform comprises a plurality of data tables for storing the UEFI setting information, and system management functions for management of the OS and hardware of the computer.

9. The method according to claim 8, wherein the system management functions comprise a boot service function and the runtime service function.

10. The method according to claim 6, wherein the runtime service function further includes a function for querying the UEFI setting information of the hardware element from the flash memory chip.

11. A non-transitory storage medium having stored thereon instructions that, when executed by a least one processor of a computer, to perform a method for updating unified extensible firmware interface (UEFI) setting information of the computer, the method comprising:
creating a system management interrupt (SMI) function based on a UEFI platform of the computer, and storing the SMI function in a system management random access memory (SMRAM) of the computer;
generating an access address of the SMI function, and storing the access address in an SMI list of the SMRAM;
obtaining the access address from the SMI list when a configuration command is input from an input device, and generating an SMI handler according to the access address;
activating the SMI function stored in the SMRAM through the SMI handler;
calling a runtime service function of the UEFI platform by executing the SMI function, wherein the runtime service function comprises a function for returning a variable for a hardware element of the computer, a function for getting a variable name of the hardware element, and a function for setting a variable for the hardware element; and
executing the runtime service function to configure UEFI setting information stored in a flash memory chip and to update basic input/output system (BIOS) data stored in a complementary metal oxide semiconductor (CMOS) chip related to the UEFI setting information.

12. The storage medium according to claim 11, wherein the UEFI platform is an interface between an operating system (OS) and hardware of the computer.

13. The storage medium according to claim 12, wherein the UEFI platform comprises a plurality of data tables for storing the UEFI setting information, and system management functions for management of the OS and hardware of the computer.

14. The storage medium according to claim 13, wherein the system management functions comprise a boot service function and the runtime service function.

15. The storage medium according to claim 11, wherein the runtime service function further includes a function for querying the UEFI setting information of the hardware element from the flash memory chip.

* * * * *